(12) United States Patent
Fischer

(10) Patent No.: US 11,726,789 B1
(45) Date of Patent: Aug. 15, 2023

(54) SELECTABLE REGISTER FILE BLOCKS FOR HARDWARE THREADS OF A MULTITHREADED PROCESSOR

(71) Applicant: NXP B.V., Eindhoven (NL)

(72) Inventor: Michael Andrew Fischer, San Antonio, TX (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/586,708

(22) Filed: Jan. 27, 2022

(51) Int. Cl.
*G06F 9/30* (2018.01)
*G06F 9/38* (2018.01)

(52) U.S. Cl.
CPC .......... *G06F 9/3851* (2013.01); *G06F 9/3009* (2013.01); *G06F 9/30112* (2013.01); *G06F 9/30123* (2013.01)

(58) Field of Classification Search
CPC .. G06F 9/3851; G06F 9/3009; G06F 9/30112; G06F 9/30123
See application file for complete search history.

(56) References Cited

U.S. PATENT DOCUMENTS

| | | | | |
|---|---|---|---|---|
| 7,596,682 B2 * | 9/2009 | Shippy | ................ | G06F 9/3851 712/228 |
| 7,991,983 B2 | 8/2011 | Wolrich et al. | | |
| 2011/0078414 A1 * | 3/2011 | Olson | .................. | G06F 9/3013 712/214 |
| 2020/0394041 A1 * | 12/2020 | Lueh | ...................... | G06F 9/544 |
| 2022/0066830 A1 * | 3/2022 | Battle | ................ | G06F 9/30098 |

OTHER PUBLICATIONS

Jeon et al.; GPU Register File Virtualization; 2015 (Year: 2015).*
Yankelevsky, Mark N. et al. "α-Coral: A Multigrain, Multithreading Processor Architecture*", ICS '01 Sorrento, Italy, (2001), pp. 358-367.
Waldspurger, Carl A. et al. "Register Relocation: Flexible Contexts for Multithreading", IEEE, (1993), pp. 120-130.

* cited by examiner

*Primary Examiner* — Corey S Faherty

(57) ABSTRACT

Embodiments of a multithreaded processor and a method of assigning blocks of register files for hardware threads of multithreaded processors are disclosed. In an embodiment, the method includes providing a multithreaded processor with a register file that provides registers for T hardware threads, the register file being organized as a set of B blocks, where each of the B blocks contains N registers and where B is greater than or equal to T, configuring assignments of the B blocks to the T hardware threads such that at least one of the B blocks of the register file and not more than R/N of the B blocks of the register file is assigned to each of the T hardware threads, where R is the number of registers defined by the instruction set architecture of the multithreaded processor and where R/N is an integer, thereby the multithreaded processor supports the T hardware threads with the register file that has less than T×R registers, and executing machine instructions on the multithreaded processor, where register numbers in the machine instructions are translated into register file addresses using the configured assignments.

17 Claims, 5 Drawing Sheets

US 11,726,789 B1

SELECTABLE REGISTER FILE BLOCKS FOR HARDWARE THREADS OF A MULTITHREADED PROCESSOR

BACKGROUND

Processors that support hardware multithreading need to store the register state for each supported thread. The conventional approach is to use a register file with T×R entries or a set of smaller register files equal to that amount, where T is the number of hardware threads, and R is the number of registers defined by the instruction set architecture (ISA). As a consequence, the size of the register file often becomes the principal constraint on the number of hardware threads that can be supported, either due to the physical area occupied by the register file, the increased time to access registers in the larger file, or the power consumption of the additional flip-flops and multiplexor gates.

Experience with event-driven multithreaded processors in embedded control applications has shown that some threads require significantly fewer registers than others. However, using established techniques, each hardware thread has an identical number of registers, which limits the number of hardware threads for event-driven multithreaded processors.

SUMMARY

Embodiments of a multithreaded processor and a method of assigning blocks of register files for hardware threads of multithreaded processors are disclosed. In an embodiment, the method includes providing a multithreaded processor with a register file that provides registers for T hardware threads, the register file being organized as a set of B blocks, where each of the B blocks contains N registers and where B is greater than or equal to T, configuring assignments of the B blocks to the T hardware threads such that at least one of the B blocks of the register file and not more than R/N of the B blocks of the register file is assigned to each of the T hardware threads, where R is the number of registers defined by the instruction set architecture of the multithreaded processor and where R/N is an integer, thereby the multithreaded processor supports the T hardware threads with the register file that has less than T×R registers, and executing machine instructions on the multithreaded processor, where register numbers in the machine instructions are translated into register file addresses using the configured assignments.

In an embodiment, wherein assigning each of the T hardware threads includes preconfiguring at least some of the B blocks of the register file when a processor register-transfer level (RTL) design is generated for the multithreaded processor to selectively assign at least some of the B blocks of the register file to the T hardware threads such that assignments of the at least some of the B blocks of the register file to the T hardware threads are fixed.

In an embodiment, wherein preconfiguring at least some of the B blocks of the register file includes preconfiguring all the B blocks of the register file when the processor register-transfer level (RTL) design is generated for the multithreaded processor to selectively assign all the B blocks of the register file to the T hardware threads such that assignments of all the B blocks of the register file to the T hardware threads are fixed.

In an embodiment, wherein some of the T hardware threads are each assigned a single B block of the register file and some of the T hardware threads are each assigned two B blocks of the register file.

In an embodiment, wherein assigning each of the T hardware threads includes assigning the B blocks of the register file that have not been preconfigured using software-controlled data in a control/status register during or after initialization of the multithreaded processor.

In an embodiment, wherein assigning each of the T hardware threads includes using a register number of an instruction as a part of a register file address and using particular data in the control/status register as another part of the register file address.

In an embodiment, the method further comprising causing an exception by an enable bit in a control/status register if the multithreaded processor attempts to access a register in a block that is not enabled for an executing thread.

In an embodiment, wherein assigning each of the T hardware threads includes assigning each of the T hardware threads at least one B block of the register file using software-controlled data in a control/status register corresponding to that hardware thread during or after initialization of the multithreaded processor.

In an embodiment, wherein assigning each of the T hardware threads at least one B block of the register file using the software-controlled data includes using a register number of an instruction as a part of a register file address and using particular data in the control/status register as another part of the register file address.

In an embodiment, a multithreaded processor comprises a register file that provides registers for T hardware threads, the register file being organized as a set of B blocks, where each B block contains N registers and where B is greater than or equal to T, wherein each of the T hardware threads is assigned at least one of the B blocks of the register file and not more than R/N of the B blocks of the register file, where R is the number of registers defined by the instruction set architecture of the multithreaded processor and where R/N is an integer, thereby the multithreaded processor supports the T hardware threads with the register file that has less than T×R registers.

In an embodiment, wherein at least some of the B blocks of the register file are preconfigured to be assigned to some of the T hardware threads when a processor register-transfer level (RTL) design is generated such that assignments of at least some of the B blocks of the register file to some of the T hardware threads are fixed.

In an embodiment, wherein all the B blocks of the register file are preconfigured to be assigned to the T hardware threads when the processor register-transfer level (RTL) design is generated such that assignments of all the B blocks of the register file to the T hardware threads are fixed.

In an embodiment, wherein some of the T hardware threads are each assigned a single B block of the register file and some of the T hardware threads are each assigned two B blocks of the register file.

In an embodiment, the multithreaded processor further comprises a block assigning circuitry to assign the B blocks of the register file that have not been preconfigured using software-controlled data in a control/status register of the block assigning circuitry during or after initialization of the multithreaded processor.

In an embodiment, wherein the block assigning circuitry includes a first register for storing a register number of an instruction, where the register number is used as a part of a register file address and particular data in the control/status register is used as another part of the register file address.

In an embodiment, wherein an enable bit in a control/status register causes an exception if the multithreaded processor attempts to access a register in a block that is not enabled for an executing thread.

In an embodiment, the multithreaded processor further comprises a plurality of block assigning circuitries to assign each of the T hardware threads at least one B block of the register file using software-controlled data in control/status registers corresponding to the T hardware threads during or after initialization of the multithreaded processor.

In an embodiment, wherein each of the plurality of block assigning circuitries includes a first register for storing a register number of an instruction, where the register number is used as a part of a register file address and particular data in the control/status register of that block assigning circuitry is used as another part of the register file address.

In an embodiment, a multithreaded processor comprises a register file that provides registers for T hardware threads, the register file being organized as a set of B blocks, where each B block contains N registers and where B is greater than or equal to T, and a block assigning circuitry configured to assign each of the T hardware threads at least one of the B blocks of the register file and not more than R/N of the B blocks of the register file, where R is the number of registers defined by the instruction set architecture of the multithreaded processor and where R/N is an integer, thereby the multithreaded processor supports the T hardware threads with the register file that has less than T×R registers.

In an embodiment, wherein at least some of the B blocks of the register file are preconfigured to be assigned to some of the T hardware threads when a processor register-transfer level (RTL) design is generated such that assignments of at least some of the B blocks of the register file to some of the T hardware threads are fixed and wherein the block assigning circuitry is configured to assign the B blocks of the register file that have not been preconfigured using software-controlled data in a control/status register of the block assigning circuitry during or after initialization of the multithreaded processor.

These and other aspects in accordance with embodiments will become apparent from the following detailed description, taken in conjunction with the accompanying drawings, illustrated by way of example of the principles of the embodiments.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended FIGS. could be arranged and designed in a wide variety of different configurations. Thus, the following more detailed description of various embodiments, as represented in the Figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the embodiments is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
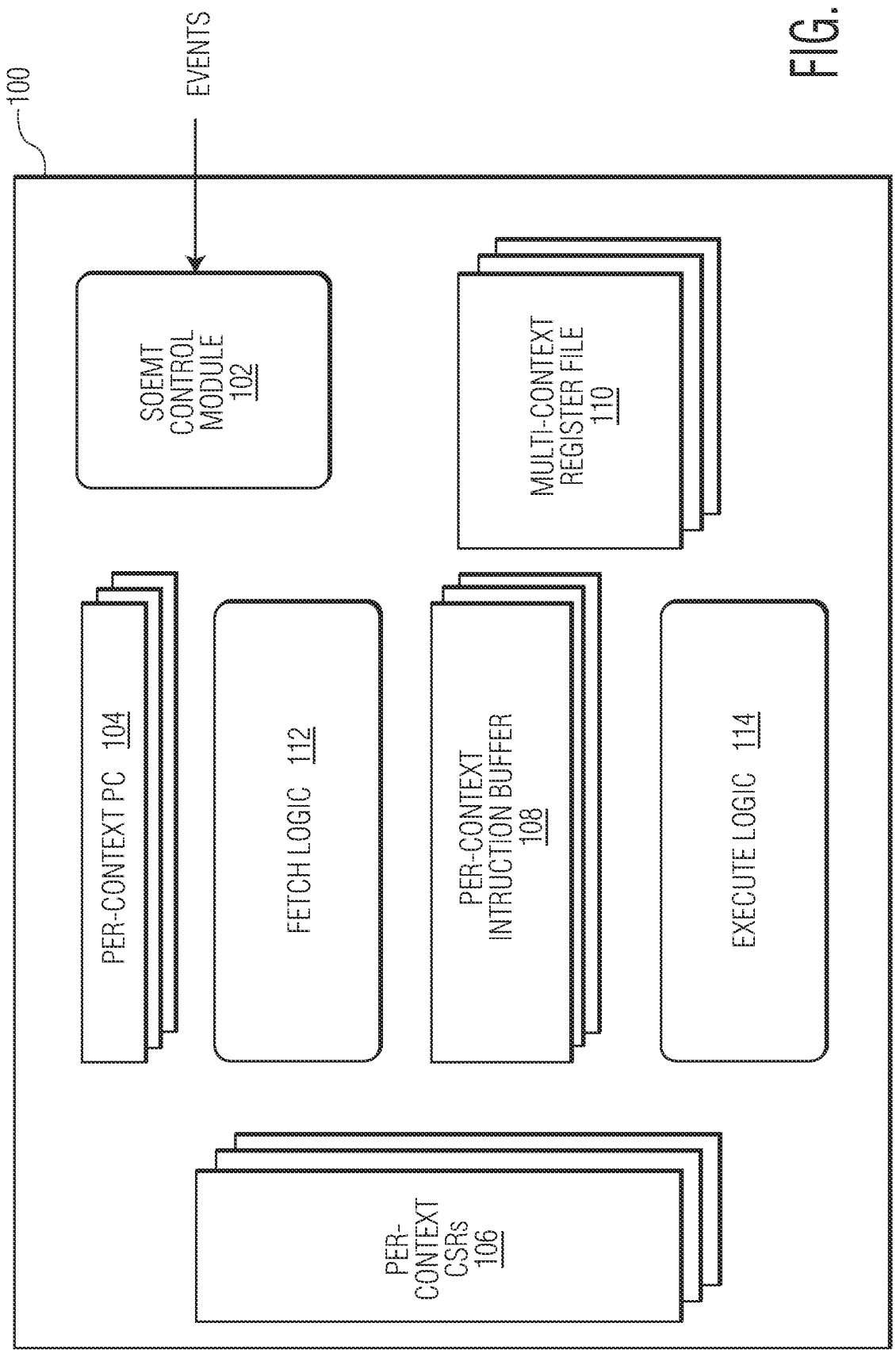
FIG. 1 is a block diagram of a multithreaded processor in accordance with an embodiment of the invention.

FIG. 1 is a schematic diagram of a multithreaded processor 100 in which embodiments of the invention can be implemented. As explained in detail below, the multithreaded processor 100 is designed to support T threads while using a register file containing fewer than T×R entries, where R is the number of registers defined by the instruction set architecture (ISA), without incurring the overhead of saving/restoring register contents when switching threads. In the illustrated embodiment, the multithreaded processor 100 uses switch-on-event multithreading (SOEMT) for processing machine instructions. However, in other embodiment, the multithreaded processor 100 may use other hardware multithreading techniques for processing machine instructions.

As shown in FIG. 1, the multithreaded processor 100 includes a SOEMT control module 102, per-context program counters (PCs) 104, a number of control/status registers (CSRs) 106, per-context instruction buffers 108 and per-context general registers 110. The SOEMT control module 102 is designed to monitor events and initiate hardware context switches, where each hardware context has its own PC 104, instruction buffer 108, and a multi-context register file 110, and may also include some CSRs 106. The events monitored by the SOEMT control module may include, but not limited to, a state-machine reset command, a physical-carrier-lost event, a timer time-out and an arithmetic overflow event, which are indicated by various hardware or software signals. In response to a particular event, an appropriate software task is assigned to a hardware context, which can be viewed as a hardware thread. For the purposes of this specification, a "hardware context" is described as the hardware required to store the current state of a thread in a form that enables the multithreaded processor to switch to or from the execution of the thread without requiring ISA-defined registers to be saved or restored to/from data memory.

Each per-context PC 104 is a register that contains the memory address of an instruction for a particular hardware context. After an instruction is fetched by a fetch logic 112 of the multithreaded processor 100, the value stored by the PC is increased. Each per-context instruction buffer 108 is a set of flip-flops or a set of registers that is used to store instructions for a particular hardware context that are fetched by the fetch logic 112, which are then executed by an execute logic 114 of the multithreaded processor 100. Source operands for and results of these instruction executions for each hardware context are then stored in the appropriate per-context registers 110. Each per-context CSR 106 is a register that is used to store control and/or status information for a particular hardware context. In some embodiments, as described below, the per-context CSRs 106 may be used to select or assign blocks of general registers 110 for the different hardware contexts.

In an embodiment, the per-context registers 110 may be implemented as a single register file. In other embodiments, the per-context registers 110 may be implemented as multiple register files.

As described in detail below, embodiments of the invention allow the number of general registers 110 used in the multithreaded processor 100 to support T number of hardware contexts to be reduced. Embodiments of the invention are primarily applicable to multithreaded processors, such as multithreaded processor 100, where software tasks are assigned to hardware threads when the tasks are initialized and execute on the same threads throughout their operation. These are generally processors using coarse-grained multithreading (CGMT) or switch-on-event multithreading (SOEMT), as well as some processors using fine-grained multithreading (FGMT). When software tasks are assigned to hardware threads in this manner, it is straightforward either to configure register file sizes as needed by the assigned tasks, or to choose the assignments of tasks to hardware threads such that the required and configured register file sizes match. Embodiments of the invention are less useful on processors which use simultaneous multithreading (SMT) or dynamic multithreading (DMT) because, on those processors, tasks are assigned to threads dynamically, and there is an implicit assumption that any task is able to execute on any thread.

While not ISA-specific, embodiments of the invention are especially useful on multithreaded processors that use the 32-bit RISC-V ISA. The reason is that the RISC-V ISA specification, unique among common ISAs, includes two, architecturally defined register file sizes: RV32I with 32 general registers (x0-x31), and RV32E with 16 general registers (x0-x15). The instruction sets of RV32I and RV32E are identical, which permits the same program development and debug tools to be used for processors with either register file size. An application binary interface (ABI) is defined that uses the registers in the range x0-x15 for all system and procedure linkage functions, thereby allowing programs compiled for RV32E to run, unmodified, on a processor that implements RV32I. While use of embodiments of the invention is not restricted to RISC-V, effective use on other ISAs requires either customization of program development tools to deal properly with the differing numbers of registers for different threads, or software implementation to be done exclusively in assembly language. Accordingly, the embodiments described below are for a multithreaded RISC-V, and the discussion below makes specific references to some RISC-V architectural characteristics.

In some embodiments, the register file of a T-thread, SOEMT RISC-V processor is organized as an integral number B of 16-register blocks (so R=32, N=16, hence R/N=2). Each thread (hart in RISC-V terminology, a contraction of "hardware thread") can be configured to access to either one or two of these blocks. If one block is configured, the hart supports RV32E and attempts by software to access register numbers in the range x16-x31 are stated in the RV32E specification to cause an illegal instruction exception. If two blocks are configured, the hart supports RV32I, and the full set of registers x0-x31 is present.

Using this approach, a larger number of threads can be supported for a given, total size register file than would be possible if all threads supported RV32I. For example, a four-thread processor using RV32I requires a register file with 128 registers (eight blocks). If three of the threads use RV32I (a total of six blocks) and two use RV32E (a total of two blocks), the same size register file permits five threads. If two of the threads use RV32I (a total of four blocks) and four use RV32E (a total of four blocks), the same size register file permits six threads. Because the amount of per-hart state outside of the main register file is quite small, it may even be practical, in some implementations, for the processor to support as many threads as there are blocks (eight threads in this example), and to leave one thread unused for each other thread that is configured to use two register blocks.

Figure 2C:
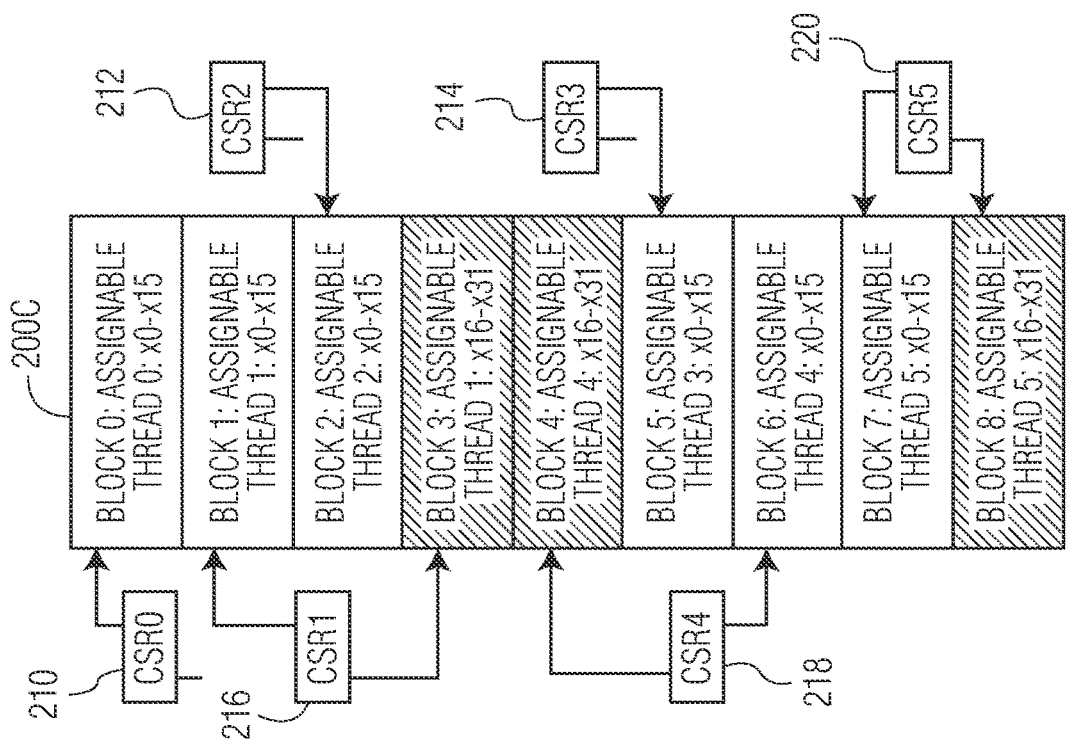
FIG. 2C illustrates a register file with only assignable blocks of registers in accordance with an embodiment of the invention.
Figure 2B:
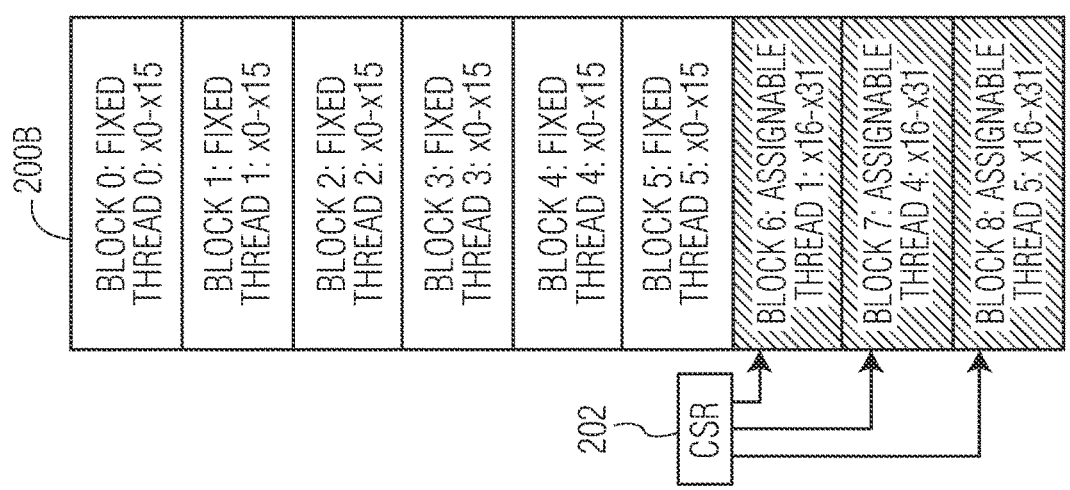
FIG. 2B illustrates a register file with fixed and assignable blocks of registers in accordance with an embodiment of the invention.
Figure 2A:
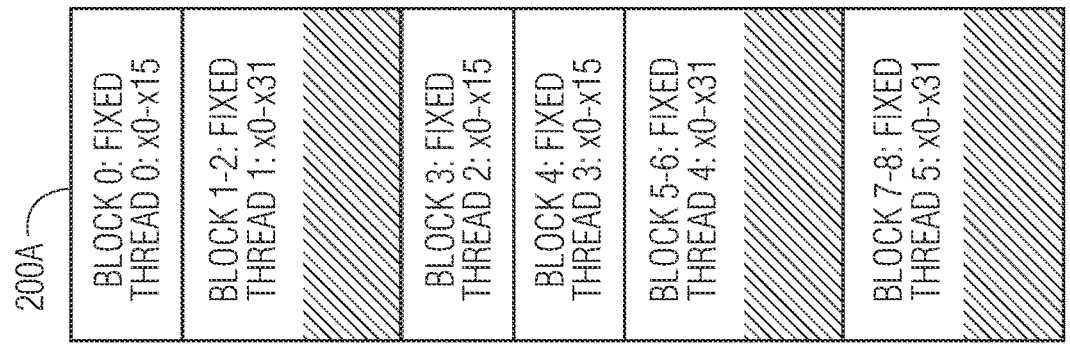
FIG. 2A illustrates a register file with only fixed blocks of registers in accordance with an embodiment of the invention.

There is no requirement that the number of blocks be a power of two. Any integer quantity of blocks is permitted. Examples include a four-thread processor with two RV32I threads and two RV32E threads, which requires six blocks (96 registers, versus 128 registers with full R×T); a six-thread processor with three RV32I threads and three RV32E threads, which requires nine blocks (144 registers, versus 192 registers with full R×T) (this example is illustrated in FIGS. 2A-2C); a seven-thread processor with three RV32I threads and four RV32E threads, which requires ten blocks (160 registers, versus 224 registers with full R×T); and an eight-thread processor with four of each threads of each type, which requires 12 blocks (192 registers, versus 256 registers with full R×T).

There are a range of implementation approaches. A common feature of all of the approaches is that each thread has its own, private set of registers and has access only to those registers using instructions in the processor's standard ISA. There may be special instructions and/or control register settings that permit privileged software to access registers belonging to other threads, but such a capability is outside the standard ISA and is not necessary to practice embodiments of the invention.

In a first approach, the register blocks of the register file are preconfigured to the hardware threads when the processor hardware register-transfer level (RTL) design is generated. An example of a register file in accordance with the first approach is illustrated in FIG. 2A. As shown in FIG. 2A, a register file 200A includes nine (9) blocks for a six-thread processor with three RV32I threads and three RV32E threads, where each block includes sixteen (16) registers. In this approach, the assignment of the blocks 0-8 is fixed, and thus, not controllable via software. As shown in FIG. 2A, in this example, threads 0, 2 and 3 are each assigned a single block. Specifically, threads 0, 2 and 3 are assigned blocks 0, 3 and 4, respectively. Threads 1, 4 and 5 are each assigned two blocks. Specifically, thread 0 is assigned blocks 1-2, thread 4 is assigned blocks 5-6 and thread 5 is assigned blocks 7-8.

This implementation of assigning register blocks to hardware threads during hardware instantiation, while simple, is inflexible because it does not permit the register configuration available to a given thread to be changed to match the needs of the software tasks assigned to the thread. On a processor where the threads are symmetric, other than in terms of the number of available registers, this lack of flexibility is not a drawback because the symmetry presents no barrier to assignment of software tasks requiring a given number of registers to threads which have that number of registers. Most FGMT processors, and some CGMT processors, use this sort of symmetric multithreading model. On the other hand, if the hardware threads have non-symmetric characteristics, this lack of flexibility can be a significant limitation, because with non-symmetric threads, the assignment of software tasks to threads is constrained by the specific non-register characteristics of each thread. While these non-symmetric hardware characteristics are known during hardware design, the number of registers required for efficient implementation of the corresponding software functions is frequently not known until long after hardware design is complete and may change during the operational life of the software. An important example of non-symmetric thread characteristics is the relative execution priorities of each thread of an SOEMT processor. On an SOEMT processor, tasks with particular real-time response requirements must be assigned to particular, high- or intermediate-priority threads. Another example of non-symmetric thread characteristics is where only a subset of the threads (typically one) has access to a particular hardware accelerator, such as a single instruction, multiple data (SIMD) arithmetic engine or a cryptographic engine. In embedded control applications, this latter form of asymmetry is common because each hardware accelerator typically requires a significant amount of internal state storage, which is impractical to replicate for concurrent use by different threads, and inefficient to save and restore for sequential use by different threads.

In a second approach, the first register block of the register file (holding x0-x15, which the ISA specification and the Application Binary Interface (ABI) requires to be present) is preconfigured to each thread when the processor hardware RTL design is generated, and an appropriate control mechanism is provided to permit software to select which threads have access to a second register block (holding x16-x31) during or after initialization of the multi-threaded processor. An example of a register file in accordance with the second approach is illustrated in FIG. 2B. As shown in FIG. 2B, a register file 202B again includes nine (9) blocks. However, in this embodiment, the assignment of the first register block for each thread is fixed, while the assignment of the second register blocks is controlled by software using a CSR 202. As shown in FIG. 2B, in this example, each of the threads 0-5 is assigned a single block from blocks 0-5. The remaining three blocks 6-8 are assignable using the CSR 202, which in this example, are assigned to threads 1, 4 and 5, respectively.

This implementation of using a fixed first register block for each thread and software-controlled configuration of the second register blocks is more flexible than the first embodiment because it permits the decision as to which of the potentially asymmetric threads have a second register block to be made by the software which is going to use those threads. The general approach for configuring the second register block is to use fields in control/status registers (CSRs). These fields normally comprise, for each thread, a bit that can be set to enable access to registers x16-x31, and multi-bit field that selects the specific register block to hold x16-x31 for the thread. However, different approaches are possible, for example, a field per assignable register block that specifies the thread number of the thread which is permitted to access that block.

In this approach, the register block selection may be done during processor initialization after hardware reset, using a single CSR to assign all of the assignable register blocks or using multiple CSRs if a single CSR has insufficient bits to hold all of the required assignment fields or if the designer chooses to use multiple CSRs for other reasons, such as to have a distinct register block assignment CSR for each thread. For each thread, if its block 2 enable field from the CSR is set, the contents of its block number field from the CSR is used by the register-access hardware to select the appropriate register block, whenever a register specifier in an instruction executed within the thread designates any of x16-x31. The particular register within this block is selected by the low-order four bits of the register specifier from the instruction. When the block 2 enable field from the CSR is clear, the register-access hardware either generates an illegal instruction exception upon encountering a register specifier that designates any of x16-x31 (the defined behavior for RV32E in the RISC-V ISA), or does whatever non-RISC-V-standard behavior is appropriate on that specific ISA. When a register specifier designates any of x0-x15, the CSR is not used, and the indicated register is accessed within the fixed first block for the thread.

Figure 3:
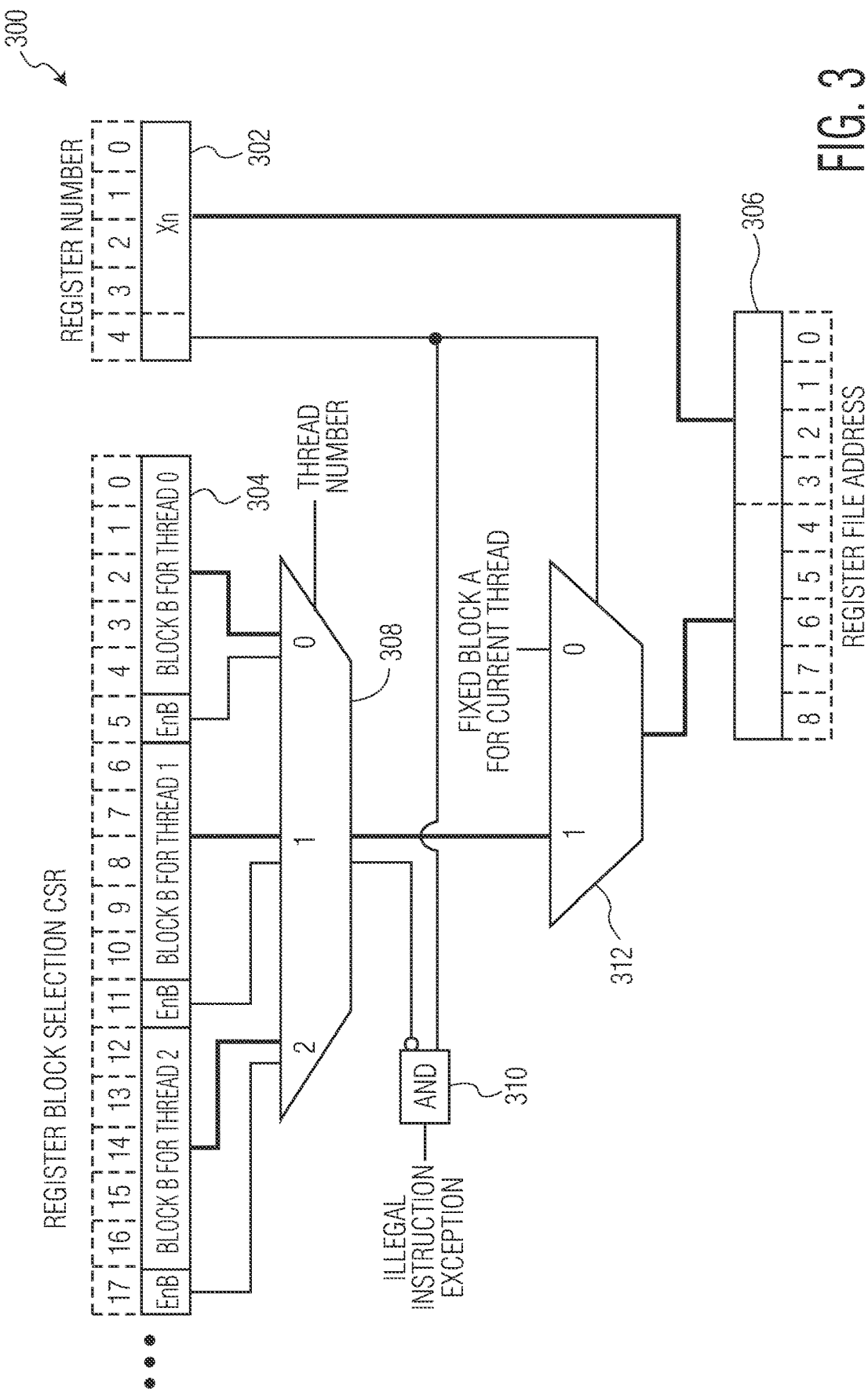
FIG. 3 is a diagram of a block assigning circuitry for the register file shown in FIG. 2B in accordance with an embodiment of the invention.

A block assignment circuitry 300 to implement the second approach in a multithreaded processor, such as the multi-threaded processor 100, in accordance with an embodiment of the invention is illustrated in FIG. 3. In the illustrated embodiment, Block A refers to the first register block of a thread and Block B refers to the second register block of the thread. As shown in FIG. 3, the block assignment circuitry 300 includes a register number (RN) input 302, a register block selection (RBS) CSR 304, a register file address (RFA) output 306, a multiplexer 308 and an AND circuit 310. In this example, the register file address is a 9-bit address to a port of the CPU's register file hardware (i.e., the register file 200B in this case). Thus, the register file address at the RFA output 306 is a 9-bit value. The register number Xn is a register selection field in the current instruction, which is received at the RN input 302. There is a copy of this logic (the RN input 302, the multiplexer 308, the AND circuit 310) for each operand specifier that can appear in an instruction (hence three copies for RISC-V), all connected to the single register block assignment register 304. Each copy generates the register file address for its associated register specifier (source 1, source 2, and destination in the case of RISC-V, as well as for most other RISC architectures). The register number Xn is 5 bits wide because the RISC-V ISA defines 32 general registers (x0-x31) and 5 bits (log base 2 of 32) are required to select one of the 32 registers. For a register file with 16-register blocks, such as the register file 200B illustrated in FIG. 2B, the low order 4 bits of the register number goes directly to the RFA output 306 and used as the low order 4 bits of the register file address.

The high order 5 bits of the register file address are derived from bits in Block B of the RBS CSR 304 for a current hardware thread. As illustrated in FIG. 3, a thread number is input to the multiplexer 308, which selects Block B for the input thread number in the RBS CSR 304. For example, if the input thread number is 0, then Block B for Thread 0 of the RBS CSR 304 would be selected and the bits in that block are transferred to the RFA output 306 to be used as the high order 5 bits of the register file address. Thus, the RBS CSR 304 includes 5-bit Block B for each hardware thread. For the register file shown in FIG. 2B, the RBS CSR 304 would include six (6) of these blocks since there are six (6) hardware threads. As illustrated in FIG. 3, the RBS CSR 304 has an enable B ("EnB") field for each Block B, which indicates whether Block B is enabled for a particular hardware thread. If the enable B bit is 1 for a particular hardware thread, then Block B for that hardware thread is valid. However, if the enable B bit is 1 for a particular hardware thread, then Block B for that hardware thread is not valid. Thus, in FIG. 2B, the enable B bit would be 0 for threads 0, 2 and 3 since these thread are assigned only a single block. However, the enable B bit would be 0 for the threads 1, 4 and 5 since these threads are assigned both blocks.

The high-order bit of the register number at the RN input 302 is the most significant bit of a 5-bit, binary number specifying the register. This bit is used differently than the four lower-order bits by the hardware in FIG. 3 because the binary values of register numbers x0-x15 have 0 as their high-order bit whereas x16-x31 have 1 as their high-order bit. Therefore, the value of this high-order bit is used to distinguish between a reference to the fixed register block used to hold x0-x15 and the software-selectable register block used to hold x16-x31. When the enable B bit from the RBS CSR 304 is 0, indicating that Block B is disabled for the current thread, and the most significant bit of the register number at the RN input 302 is 1, indicating a reference to a register in the range x16-x31, then an illegal instruction exception signal is generated by the AND circuit 310.

The block assignment circuitry 300 further includes a 2:1 multiplexer 312 that generates the high-order bits of the register file address when the high-order bit of the register number is 0 (meaning a reference to Block A, registers in the range x0-x15). The control input to this multiplexer 312 is the high-order bit of the register number. When the high-order bit of the register number is 0, this bit selects the fixed block number of the block assigned for Block A by the hardware designer. When the high-order bit of the register number is 1, this bit selects the programmable block number from the output of the multiplexer 308 is selected for use as the high-order bits of the register file address.

In a third embodiment, a set of control registers is provided which permit software to configure access to all register blocks of all threads, including those used for x0-x15. An example of a register file in accordance with the third embodiment is illustrated in FIG. 2C. As shown in FIG. 2C, a register file 200C again includes nine (9) blocks. However, in this embodiment, the assignment of all blocks 0-8 is controlled by software using a CSR for each thread. As shown in FIG. 2C, in this example, threads 0, 2 and 3 are assigned to blocks 0, 2 and 5, respectively, using CSRs 210, 212 and 214, which are labeled CSR0, CSR2 and CSR3 in FIG. 2C. In addition, thread 1 is assigned blocks 1 and 3 using a CSR 216, thread 4 is assigned blocks 4 and 6 using a CSR 218, and thread 5 is assigned blocks 7-8 using a CSR 220, which are labeled CSR1, CSR4 and CSR5 in FIG. 2C.

Figure 4:
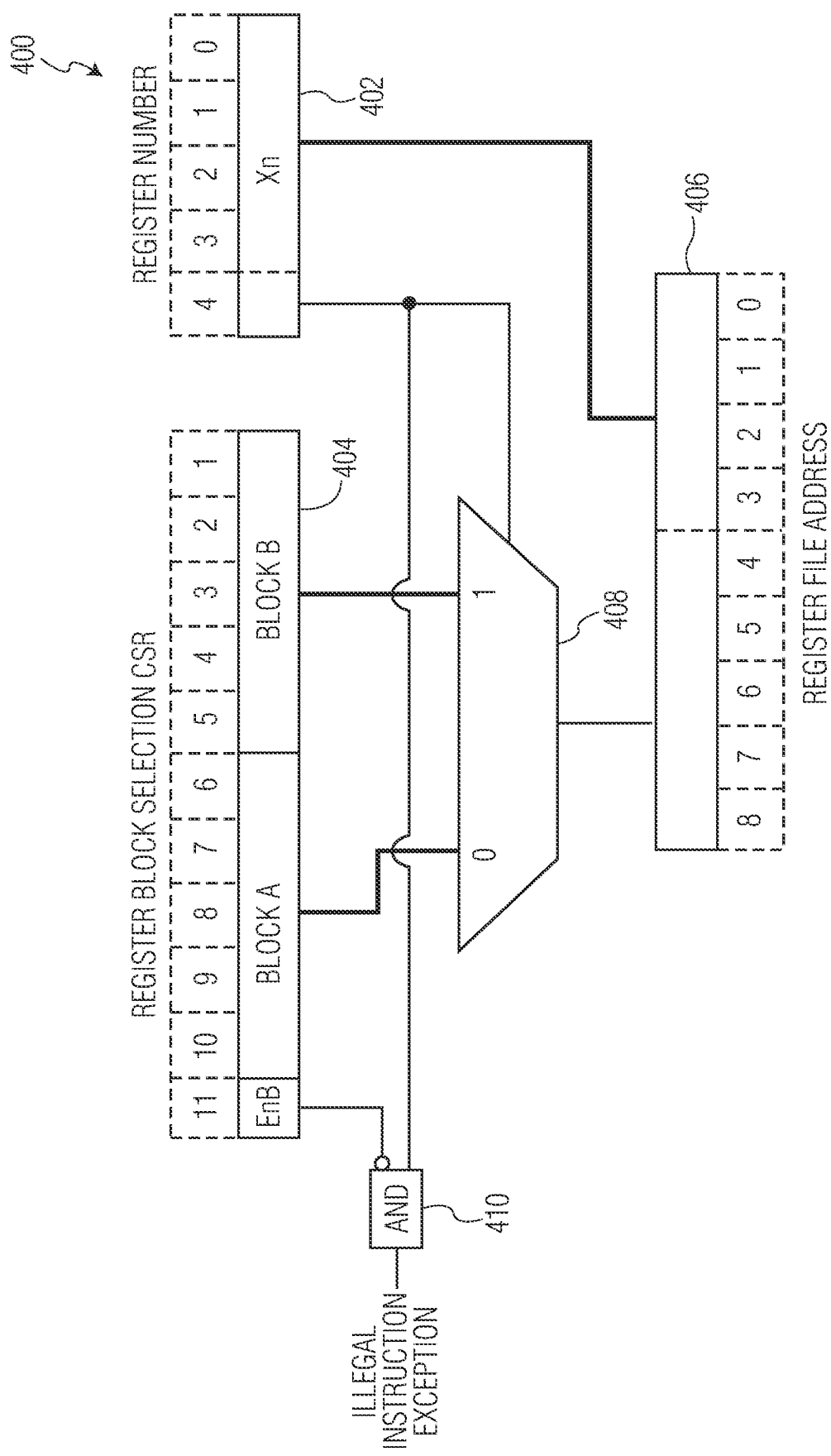
FIG. 4 is a diagram of one of block assigning circuitries for the register file shown in FIG. 2C in accordance with an embodiment of the invention.

This implementation of using software-controlled configuration of all register blocks is the most flexible, but the additional complexity, compared to the second embodiment, is only justified in those cases where the software architecture can benefit from the ability to change the block in use for x0-x15. Configuration of register blocks is performed in a similar manner as for the second embodiment, but with a third field, used to select the specific register block used for the first register block (x0-x15) by this thread. There is no need for an enable bit for the first register block, because access to those registers must always be enabled. Typically, these fields are held in separate CSRs for each thread. Use of a per-thread CSR is appropriate for cases where the register block selection is performed directly by software executing within the thread. A possible layout for this per-thread CSR, for a processor that supports up to 32 register blocks, is shown in FIG. 4 and described below. In another possible embodiment, a single CSR holds the register block configuration fields for multiple threads. Grouping of the register selection fields into fewer CSRs is simpler for cases where all of the register block selection is performed by software executing within a single thread, for example, initialization or supervisory software.

There are several ways that the microarchitecture of a multithreaded processor might provide the required plurality of register blocks. One approach is to implement a single, physical register array of sufficient capacity to hold all of the registers in all of the blocks. Using such an approach, individual registers are addressed by concatenating the low-order four bits of the register specifier value from the instruction with the register block selector. In an embodiment, the register block selector is either the thread number (hart ID in RISC-V terminology), for accesses to x0-x15, or the contents of the relevant block selector field in the CSR, for accesses to x16-x31. If using software-controlled configuration of all register blocks, the contents of the Block A selector field is used on accesses to x0-x15, rather than the thread number.

A block assignment circuitry 400 to implement the third approach in a multithreaded processor, such as the multithreaded processor 100, in accordance with an embodiment of the invention is illustrated in FIG. 4. In the illustrated embodiment, Block A refers to the first register block of a thread and Block B refers to the second register block of the thread. As shown in FIG. 4, the block assignment circuitry 400 includes a register number (RN) input 402, a register block selection (RBS) CSR 404, a register file address (RFA) output 406, a multiplexer 408 and an AND circuit 410. In this example, the register file address is a 9-bit address to a port of the CPU's register file hardware (i.e., the register file 200C in this case). Thus, the register file address at the RFA output 406 is a 9-bit value. There is a copy of this logic (the RN input 402, the multiplexer 408, the AND circuit 410) for each operand specifier that can appear in an instruction (hence three copies for RISC-V), all connected to the single register block assignment register 404. Each copy generates the register file address for its associated register specifier (source 1, source 2, and destination in the case of RISC-V, as well as for most other RISC architectures). The register number Xn is 5 bits wide because the RISC-V ISA defines 32 general registers (x0-x31) and 5 bits (log base 2 of 32) are required to select one of the 32 registers. For a register file with 16-register blocks, such as the register file illustrated in FIG. 2C, the low order 4 bits of the register number goes directly to the RFA output 406 and used as the low order 4 bits of the register file address.

The most significant bit of the register number at the RN input 402 is used to select either Block A or Block B of the RBS CSR 404. In the illustrated embodiment, if the most significant bit of the register number is 0, then Block A of the RBS CSR 404 is selected and the bits in the Block A are transferred to the RFA output 406 to be used as the high order 5 bits of the register file address. However, if the most significant bit of the register number is 1, then Block B of the RBS CSR 404 is selected and the bits in the Block B are transferred to the RFA output to be used as the high order 5 bits of the register file address. The most significant bit in the RBS CSR 404 is used to enable or disable Block B. If the enable B bit is 0, then only Block A is valid. However, if the enable B bit is 1, then both Block A and Block B are valid. Thus, in FIG. 2C, for the CSRs 210, 212 and 214, the enable B bit would be 0 since these CSRs are used to assign a single block for the respective hardware threads 0, 2 and 3. However, for the CSRs 216, 218 and 220, the enable B bit would be 1 since these CSRs are used to assign both blocks for the respective hardware threads 1, 4 and 5. If the enable B bit is 0 but the bit 4 of the register number is 1 (i.e., selecting Block B), then an illegal instruction exception signal is generated by the AND circuit 410. For the 6-thread processor that uses the register file 200C, there would be six (6) RBS CSRs 404. However, there would be an instance of the selection circuitry 408 and 410 for each register specifier that can appear in a single instruction (three copies in the case of RISC-V and most other RISC processors, just as with instances of the similar circuitry of FIG. 3).

For any pipelined microarchitecture with operand bypassing that uses embodiments of the invention, the logic that controls the operand bypass multiplexors must consider the full addresses of the physical register, rather than just the register specifiers in the instruction word. This is necessary because instructions accessing the same register number for different threads may be in the pipeline simultaneously. This is simply an implementation constraint, because the equivalent situation exists on some prior art processors that use simultaneous multithreading (SMT). Another implementation consideration is that, if changes to the register block selection CSRs is permitted after processor initialization, a mechanism must exist to ensure deterministic results for register references by instructions that are in the pipeline when the register block selection is changed.

Figure 5:
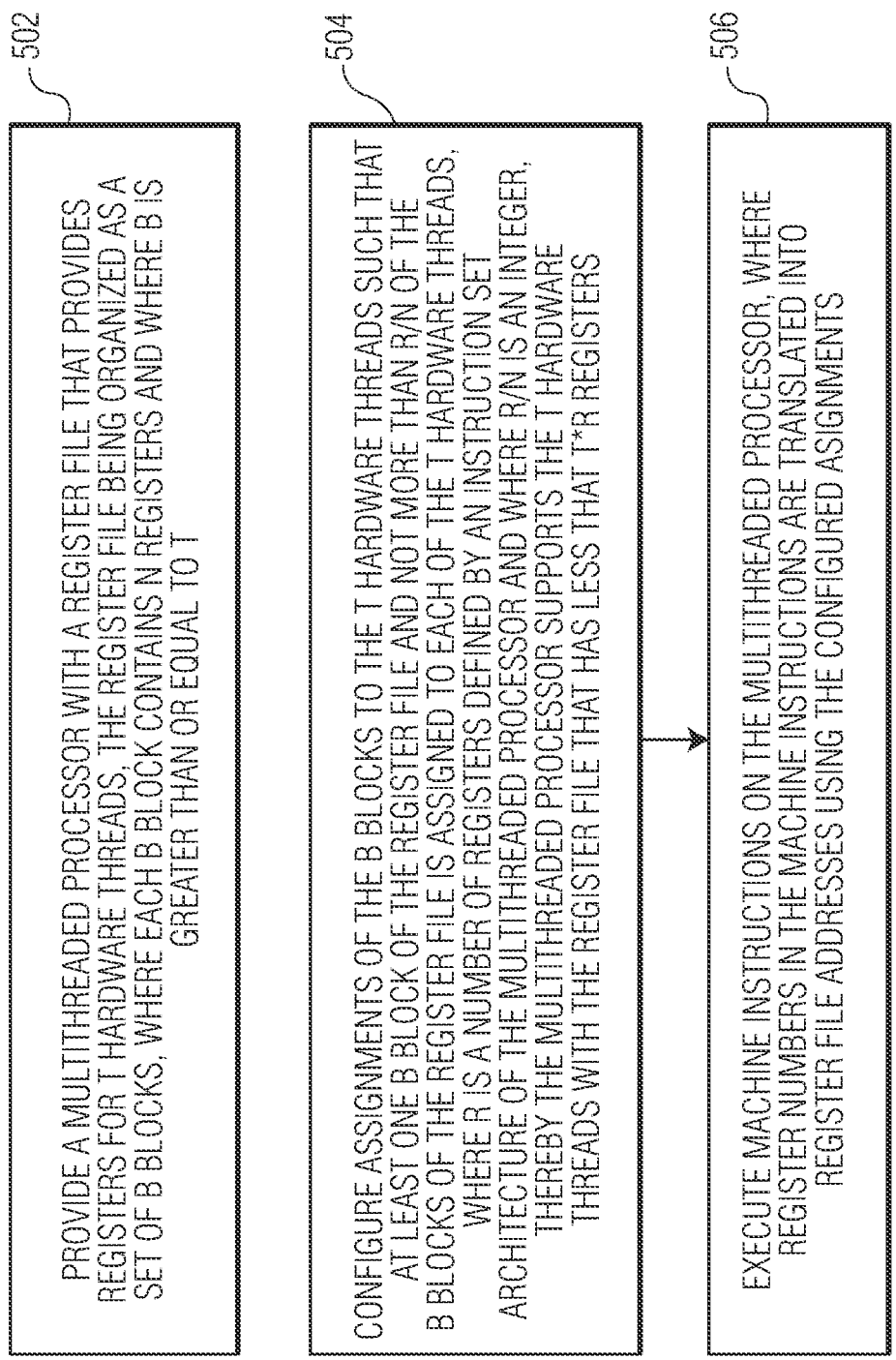
FIG. 5 is a process flow diagram of a method for assigning blocks of register files for hardware threads of multithreaded processors in accordance with an embodiment of the invention.

A method for assigning blocks of register files for hardware threads of multithreaded processors in accordance with an embodiment of the invention is described with reference to a process flow diagram of FIG. 5. At block 502, a multithreaded processor with a register file that provides registers for T hardware threads is provided. The register file is organized as a set of B blocks, where each B block contains N registers and where B is greater than or equal to T. At block 504, the assignments of the B blocks are configured to the T hardware threads such that at least one of the B blocks of the register file and not more than R/N of the B blocks of the register file is assigned to each of the T hardware threads, where R is a number of registers defined by the instruction set architecture of the multithreaded processor and where R/N is an integer, thereby the multithreaded processor supports the T hardware threads with the register file that has less than T×R registers. At block 506, machine instructions are executed on the multithreaded processor, where register numbers in the machine instructions are translated into register file addresses using the configured assignments.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It can also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments that use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of assigning blocks of register files for hardware threads of multithreaded processors, the method comprising:
  providing a multithreaded processor with a register file that provides registers for T hardware threads, the register file being organized as a set of B blocks, where each B block contains N registers and where B is greater than or equal to T; and
  configuring assignments of the B blocks to the T hardware threads such that at least one of the B blocks of the register file and not more than R/N of the B blocks of the register file is assigned to each of the T hardware threads, where R is a quantity of registers defined by an instruction set architecture of the multithreaded processor and where R/N is an integer, thereby the multithreaded processor supports the T hardware threads with the register file that has less than T×R registers, wherein assigning each of the T hardware threads includes preconfiguring at least some of the B blocks of the register file when a processor register-transfer level (RTL) design is generated for the multithreaded processor to selectively assign at least some of the B blocks of the register file to the T hardware threads such that assignments of the at least some of the B blocks of the register file to the T hardware threads are fixed; and executing machine instructions on the multithreaded processor, where register numbers in the machine instructions are translated into register file addresses using the configured assignments.

2. The method of claim 1, wherein preconfiguring at least some of the B blocks of the register file includes preconfiguring all the B blocks of the register file when the processor register-transfer level (RTL) design is generated for the multithreaded processor to selectively assign all the B blocks of the register file to the T hardware threads such that assignments of all the B blocks of the register file to the T hardware threads are fixed.

3. The method of claim 2, wherein some of the T hardware threads are each assigned a single B block of the register file and some of the T hardware threads are each assigned two B blocks of the register file.

4. The method of claim 1, wherein assigning each of the T hardware threads includes assigning the B blocks of the register file that have not been preconfigured using software-controlled data in a control/status register during or after initialization of the multithreaded processor.

5. The method of claim 4, wherein assigning each of the T hardware threads includes using a register number of an instruction as a part of a register file address and using particular data in the control/status register as another part of the register file address.

6. The method of claim 1, further comprising causing an exception by an enable bit in a control/status register if the multithreaded processor attempts to access a register in a block that is not enabled for an executing thread.

7. The method of claim 1, wherein assigning each of the T hardware threads includes assigning each of the T hardware threads at least one B block of the register file using software-controlled data in a control/status register corresponding to that hardware thread during or after initialization of the multithreaded processor.

8. The method of claim 7, wherein assigning each of the T hardware threads at least one B block of the register file using the software-controlled data includes using a register number of an instruction as a part of a register file address and using particular data in the control/status register as another part of the register file address.

9. A multithreaded processor comprising:
a register file that provides registers for T hardware threads, the register file being organized as a set of B blocks, where each B block contains N registers and where B is greater than or equal to T,
wherein each of the T hardware threads is assigned at least one of the B blocks of the register file and not more than R/N of the B blocks of the register file, where R is a quantity of registers defined by an instruction set architecture of the multithreaded processor and where R/N is an integer, thereby the multithreaded processor supports the T hardware threads with the register file that has less than T×R registers, and
wherein at least some of the B blocks of the register file are preconfigured to be assigned to some of the T hardware threads when a processor register-transfer level (RTL) design is generated such that assignments of at least some of the B blocks of the register file to some of the T hardware threads are fixed.

10. The multithreaded processor of claim 9, wherein all the B blocks of the register file are preconfigured to be assigned to the T hardware threads when the processor register-transfer level (RTL) design is generated such that assignments of all the B blocks of the register file to the T hardware threads are fixed.

11. The multithreaded processor of claim 10, wherein some of the T hardware threads are each assigned a single B block of the register file and some of the T hardware threads are each assigned two B blocks of the register file.

12. The multithreaded processor of claim 9, further comprising a block assigning circuitry to assign the B blocks of the register file that have not been preconfigured using software-controlled data in a control/status register of the block assigning circuitry during or after initialization of the multithreaded processor.

13. The multithreaded processor of claim 12, wherein the block assigning circuitry includes a first register for storing a register number of an instruction, where the register number is used as a part of a register file address and particular data in the control/status register is used as another part of the register file address.

14. The multithreaded processor of claim 12, wherein an enable bit in a control/status register causes an exception if the multithreaded processor attempts to access a register in a block that is not enabled for an executing thread.

15. The multithreaded processor of claim 9, further comprising a plurality of block assigning circuitries to assign each of the T hardware threads at least one B block of the register file using software-controlled data in control/status registers corresponding to the T hardware threads during or after initialization of the multithreaded processor.

16. The multithreaded processor of claim 15, wherein each of the plurality of block assigning circuitries includes a first register for storing a register number of an instruction, where the register number is used as a part of a register file address and particular data in the control/status register of that block assigning circuitry is used as another part of the register file address.

17. A multithreaded processor comprising:
a register file that provides registers for T hardware threads, the register file being organized as a set of B blocks, where each B block contains N registers and where B is greater than or equal to T; and
a block assigning circuitry configured to assign each of the T hardware threads at least one of the B blocks of the register file and not more than R/N of the B blocks of the register file, where R is a quantity of registers defined by an instruction set architecture of the multithreaded processor and where R/N is an integer, thereby the multithreaded processor supports the T hardware threads with the register file that has less than T×R registers, wherein at least some of the B blocks of the register file are preconfigured to be assigned to some of the T hardware threads when a processor register-transfer level (RTL) design is generated such that assignments of at least some of the B blocks of the register file to some of the T hardware threads are fixed and wherein the block assigning circuitry is configured to assign the B blocks of the register file that have not been preconfigured using software-controlled data in a control/status register of the block assigning circuity during or after initialization of the multithreaded processor.

* * * * *